United States Patent
Wilson (10) Patent No.: US 8,410,748 B2
(45) Date of Patent: Apr. 2, 2013

(54) REMOVABLE PHOTOVOLTAIC CHARGING PACK INCLUDING A DEVICE COMPARTMENT AND CONTAINER INCLUDING A RECEIVING COMPARTMENT WITH A TRANSPARENT PANEL TO HOLD THE CHARGING PACK

(75) Inventor: David M. Wilson, Alsip, IL (US)

(73) Assignee: Global Resource Management, Inc., Alsip, IL (US)

( * ) Notice: Subject to any disclaimer, the term of this patent is extended or adjusted under 35 U.S.C. 154(b) by 561 days.

(21) Appl. No.: 12/568,260

(22) Filed: Sep. 28, 2009

(65) Prior Publication Data

US 2011/0006725 A1 Jan. 13, 2011

Related U.S. Application Data

(60) Provisional application No. 61/270,691, filed on Jul. 13, 2009.

(51) Int. Cl.
*H01M 10/46* (2006.01)
(52) U.S. Cl. .......................... 320/101; 136/251
(58) Field of Classification Search ................. 320/101, 320/107; 136/251
See application file for complete search history.

(56) References Cited

U.S. PATENT DOCUMENTS

| 5,522,943 | A | | 6/1996 | Spencer et al. | |
|---|---|---|---|---|---|
| 5,701,067 | A | * | 12/1997 | Kaji et al. | 320/101 |
| 5,855,692 | A | * | 1/1999 | Kaji et al. | 136/245 |
| 6,870,089 | B1 | | 3/2005 | Gray | |
| 7,619,884 | B1 | * | 11/2009 | Gray | 361/679.41 |
| 2004/0178913 | A1 | * | 9/2004 | Penuela et al. | 340/573.1 |
| 2005/0140331 | A1 | | 6/2005 | McQuade | |
| 2005/0161079 | A1 | * | 7/2005 | Gray | 136/291 |
| 2006/0012331 | A1 | * | 1/2006 | Gillette | 320/107 |
| 2006/0225781 | A1 | | 10/2006 | Locher | |
| 2006/0273757 | A1 | | 12/2006 | Naguib | |
| 2008/0011799 | A1 | | 1/2008 | Chang | |
| 2008/0210728 | A1 | | 9/2008 | Bihn | |
| 2008/0231225 | A1 | * | 9/2008 | Lin | 320/101 |

OTHER PUBLICATIONS

Unknown, Surge for iPod touch: Solar Energy Solutions: Hybrid solar charger for iPod touch, http://www.novothink.com/products/nt02/, 2009, 6 pgs., Novothink, Inc., USA.
Unknown, Reactor Solar Panel Backpack—Timber Camo, http://www.earthtechproducts.com/p2536.html?gdftrk=gdfV2538_a_7c63 . . . , 2006-2009, 2 pgs., EarthTech Products, USA.
Unknown, Voltaic Systems: Voltaic Generator Solar Laptop Charger, http://www.voltaicsystems.com/bag_generator.shtml, 2 pgs., Voltaic, USA, 2009.
Unknown, Voltaic Systems: Voltaic Solar Bags and Solar Charges, http://www.voltaicsystems.com/, 2 pgs., Voltaic, USA, 2009.

* cited by examiner

*Primary Examiner* — Yalkew Fantu
*Assistant Examiner* — Manuel Hernandez
(74) *Attorney, Agent, or Firm* — Armstrong Teasdale LLP (57) ABSTRACT

A portable container having an exterior surface and defining an interior compartment. The portable container includes a photovoltaic (PV) charging pack and a receiving device coupled to the exterior surface for detachably coupling the PV charging pack to the exterior surface. The PV charging pack includes a PV panel and defines a compartment for containing a portable electronic device. The PV panel is oriented away from the exterior surface when the PV charging pack is coupled to the receiving device.

5 Claims, 11 Drawing Sheets

REMOVABLE PHOTOVOLTAIC CHARGING PACK INCLUDING A DEVICE COMPARTMENT AND CONTAINER INCLUDING A RECEIVING COMPARTMENT WITH A TRANSPARENT PANEL TO HOLD THE CHARGING PACK

CROSS-REFERENCE TO RELATED APPLICATIONS

This application claims the benefit of U.S. Provisional Patent Application No. 61/270,691, filed 13 Jul. 2009, which is herein incorporated by reference in its entirety.

BACKGROUND OF THE INVENTION

The subject matter described herein relates generally to photovoltaic charging systems and, more particularly, to portable containers including photovoltaic cells.

Use of portable electronic devices is widespread and continues to grow. A portable electronic device requires electrical energy to function and, therefore, typically includes an energy storage device (e.g., a battery). During a period of high energy usage or an extended time away from a conventional energy source, an electronic device may deplete its energy storage device and become inoperable until connected to an energy source.

Existing photovoltaic charging systems provide a portable energy source for recharging an energy storage device of a portable electronic device. Further, some containers incorporate a photovoltaic charging system. However, a need exists for a self-contained photovoltaic charging pack that can be removably coupled to a carrying device.

BRIEF DESCRIPTION OF THE INVENTION

In one aspect, a portable container having an exterior surface and defining an interior compartment is provided. The portable container includes a photovoltaic (PV) charging pack and a PV charging pack receiving device coupled to the exterior surface for detachably coupling the PV charging pack to the exterior surface. The PV charging pack includes a PV panel and defines a compartment for containing a portable electronic device. The PV panel is configured to absorb light energy when the PV charging pack is coupled to the receiving device.

In another aspect, a portable PV charging pack is provided. The PV charging pack includes at least one PV panel, a compartment defined by the PV charging pack for containing a portable electronic device, a charging connector electrically coupled to the at least one PV panel, and a mounting device for removably coupling the PV charging pack to a receiving device.

DETAILED DESCRIPTION OF THE INVENTION

The embodiments described herein provide a photovoltaic (PV) charging pack for a portable electronic device. The charging pack includes a compartment for containing a portable electronic device and a photovoltaic (PV) panel for charging the device. The charging pack is removably coupled to a carrying device, such as a backpack or an article of clothing, such that the charging pack can be attached to and detached from the carrying device. The container may also include an energy storage device.

As used herein, the term PV panel is intended to indicate any substantially panel-shaped device for converting electromagnetic radiation approximately within the visible light and ultraviolet ranges ("light energy" herein) from the sun or any other suitable source into electrical energy. A PV panel may include one or more PV cells.

Figure 1:
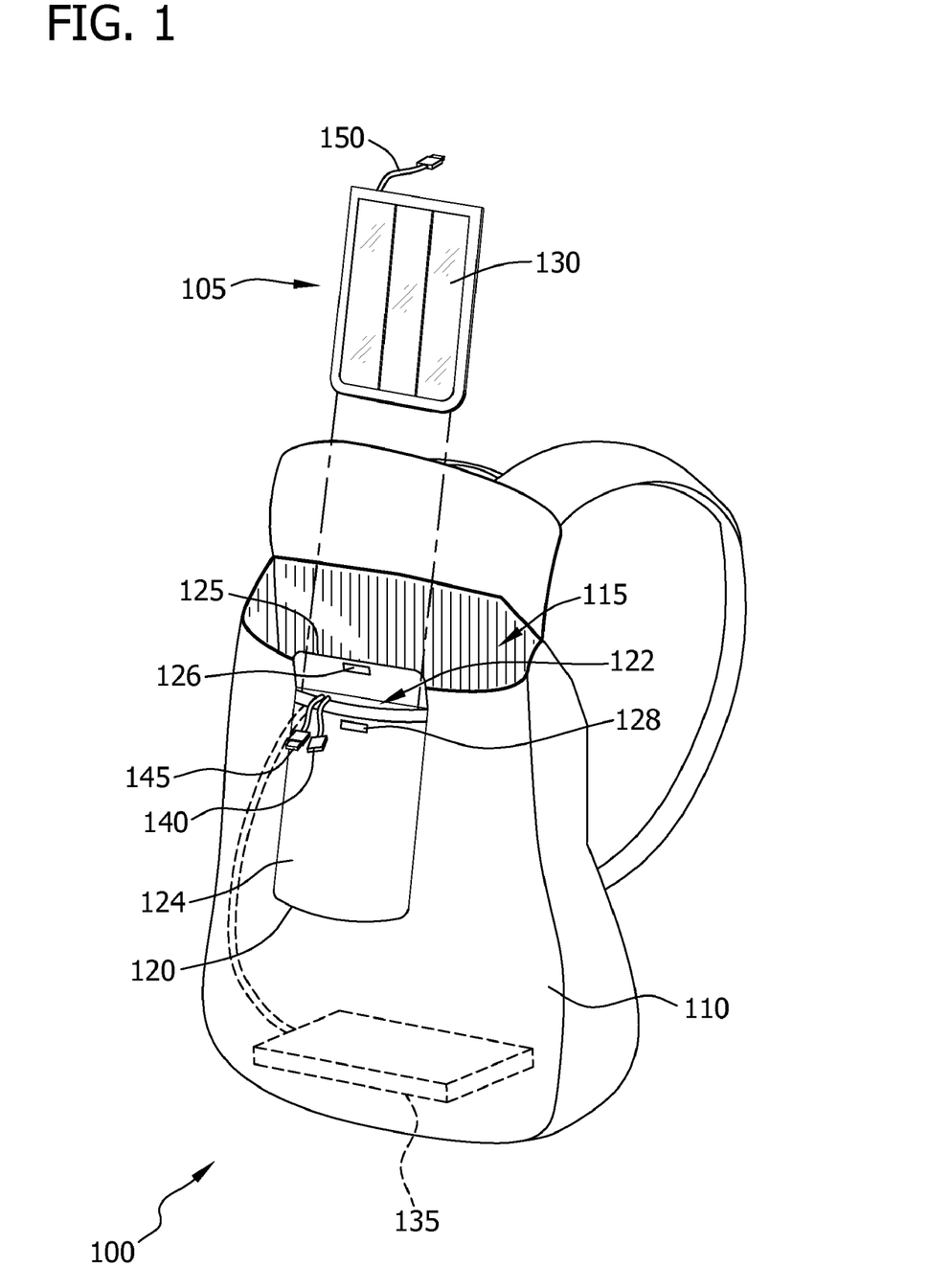
FIG. 1 is a perspective view of an exemplary portable container with a removably couplable PV charging pack.

FIG. 1 is a perspective view of an exemplary portable container 100 with a removably couplable PV charging pack 105. Container 100 may be any device for containing and transporting objects. For example, container 100 may include, without limitation, luggage, a golf bag, a waist pack, a computer case, a messenger bag, a briefcase, and/or a duffel bag. In FIG. 1, container 100 is illustrated as a backpack.

Container 100 has an exterior surface 110 and defines an interior compartment 115. Container 100 includes a PV charging pack receiving device 120 coupled to exterior surface 110 for detachably coupling PV charging pack 105 to exterior surface 110. Receiving device 120 may be sewn to, riveted to, adhered to, molded with, embedded within, and/or otherwise coupled to exterior surface 110.

In one embodiment, receiving device 120 includes a receiving compartment 122 with a substantially transparent panel 124. PV charging pack 105 is positionable within receiving compartment 122, and panel 124 is configured to allow light from outside panel 124 to reach PV charging pack 105. PV charging pack 105 may or may not include a mounting device 170 (shown in FIG. 2), as receiving compartment 122 is operable to retain PV charging pack 105. Receiving device 120 may also include a receiving compartment closing device 125, such as a flap, to facilitate securing PV charging pack 105 within receiving compartment 122 and/or to prevent environmental elements (e.g., rain and/or dirt) from entering receiving compartment 122. In one embodiment, receiving compartment closing device 125 includes an attachment device 126, and receiving device 120 and/or exterior surface 110 includes a complementary attachment device 128. For example, attachment devices may include a hook-and-loop fastener, a zipper, a snap fastener, a clip fastener, a strap and a buckle, a strap and a loop, a button and a buttonhole, mutually attractive magnets, and/or a magnet and a ferromagnetic component.

PV charging pack 105 includes a PV panel 130. PV charging pack 105 also defines a compartment 310 (shown in FIG. 5) for containing a portable electronic device, such as a portable music player or a cellular phone. When PV charging pack 105 is coupled to receiving device 120, PV panel 130 is configured or positioned to absorb light energy. In one embodiment, PV panel 130 faces away from exterior surface 110.

In some embodiments, container 100 includes an energy storage device 135. In one embodiment, container 100 also includes an energy input connector 140 for charging energy storage device 135 and an energy output connector 145 for powering and/or charging a device (e.g., a portable electronic device or another energy storage device) from energy storage device 135. Energy input connector 140 and energy output connector 145 are electrically coupled to energy storage device 135.

PV charging pack 105 includes a charging connector 150 for electrically coupling PV charging pack 105 to a portable electronic device 445 (shown in FIG. 8) and/or to energy storage device 135 (e.g., via energy input connector 140). Such embodiments facilitate charging energy storage device 135 from PV panel 130. In addition, or alternatively, PV charging pack 105 may include an energy storage device 430 (shown in FIG. 8).

In one embodiment, container 100 includes energy storage device 135 (e.g., a battery), and PV charging pack 105 includes another energy storage device. Charging connector 150 is electrically couplable to either energy storage device 135 or the energy storage device of PV charging pack 105. In another embodiment, charging connector 150 is electrically couplable to energy storage device 135 (e.g., via energy input connector 140), and container 100 includes energy output connector 145 for electrically coupling energy storage device 135 to the energy storage device of PV charging pack 105. Such an embodiment facilitates charging the energy storage device of PV charging pack 105 by PV panel 130 and/or energy storage device 135.

Figure 8:
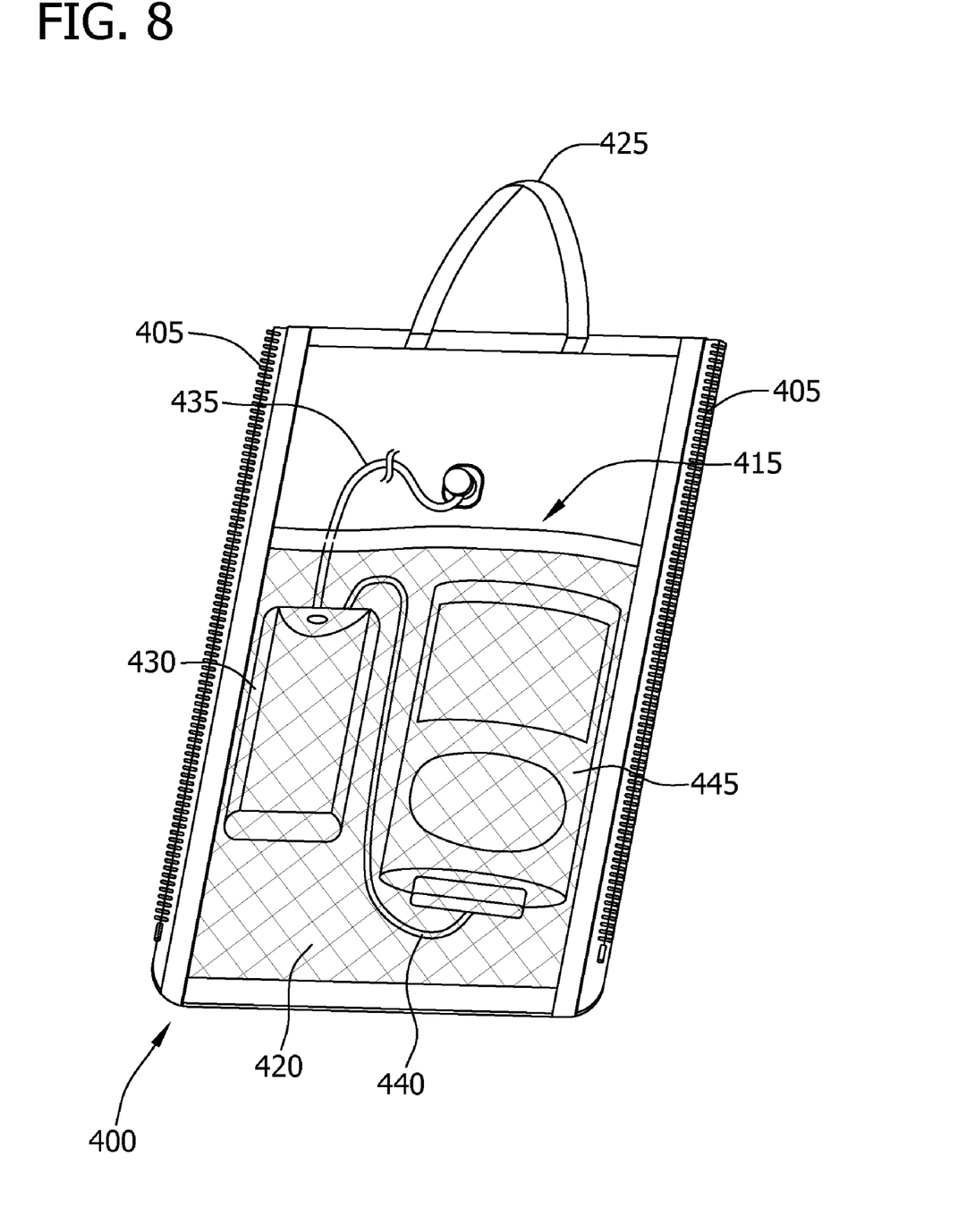
FIG. 8 is a perspective posterior view of the PV charging pack shown in FIGS. 6 and 7.

In one embodiment, charging connector 150 is electrically couplable to energy storage device 135 via energy input connector 140, and energy storage device 135 is electrically couplable, via energy output connector 145, to the energy storage device of PV charging pack 105, which is electrically couplable to a portable electronic device via an additional charging connector (shown in FIG. 8). Each of charging connector 150, energy output connector 145, and the additional charging connector may be compatible with the portable electronic device, in which case the portable electronic device is electrically couplable to any of the PV panel 130, energy storage device 135, and the energy storage device of PV charging pack 105.

Electrical connectors such as charging connector 150, energy input connector 140, and energy output connector 145 may include, without limitation, cables with one or more Universal Serial Bus (USB) connectors (e.g., a plug or a receptacle), such as a USB Type A, USB Type B, USB Mini-A, USB Mini-B, USB Micro-AB, and/or USB Micro-B connector. Energy storage device 135 and the energy storage device of PV charging pack 105 may include, without limitation, a battery, a capacitor, a fuel cell, and/or any suitable device operable to absorb electrical energy, store the energy in electrical form or another form, and discharge the stored energy as electrical energy.

Figure 2:
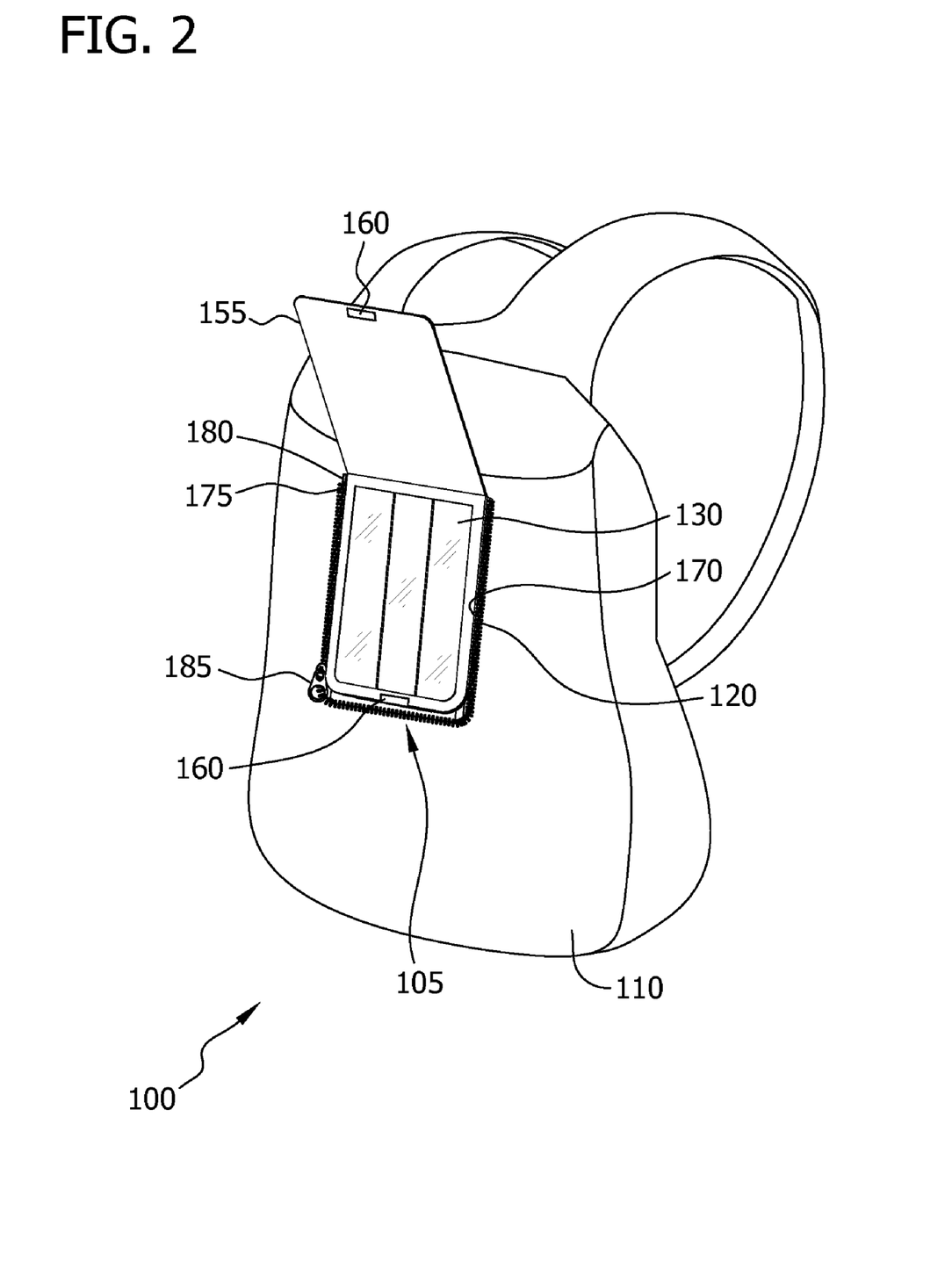
FIG. 2 is a perspective view of the container shown in FIG. 1 with the PV charging pack coupled thereto.

FIG. 2 is a perspective view of container 100 with PV charging pack 105 coupled to exterior surface 110. Coupling PV charging pack 105 to container 100 facilitates transportation of PV charging pack 105 and the contents thereof with PV panel 130 exposed, further facilitating charging of a portable electronic device.

In an exemplary embodiment, PV charging pack 105 includes a mounting device 170 for removably coupling PV charging pack 105 to container 100. In one embodiment, mounting device 170 is removably couplable to receiving device 120.

In some embodiments, mounting device 170 and receiving device 120 include complementary fasteners. In an exemplary embodiment, receiving device 120 and mounting device 170 are zippers 175 and 180, respectively, and zipper 175 includes a slider 185 for coupling zipper 175 to zipper 180. Other complementary fasteners include, but are not limited to, a hook-and-loop fastener, a snap fastener, a clip fastener, a strap and a loop, a strap and a buckle, a button and a buttonhole, mutually attractive magnets, a magnet and a ferromagnetic component, and/or a hook and a ring or loop.

In some embodiments, a concealing flap 155 is provided for covering PV panel 130. For example, concealing flap 155 may be coupled to PV charging pack 105, such that concealing flap 155 is operable to cover PV panel 130 regardless of whether PV charging pack 105 is coupled to container 100. Alternatively, concealing flap 155 may be coupled to container 100 such that concealing flap 155 is operable to cover PV panel 130 when PV charging pack 105 is coupled to container 100. In one embodiment, concealing flap 155 is sized to cover substantially all of charging pack 105 and/or receiving device 120. Concealing flap 155 may be secured in an engaged position by one or more fasteners 160, such as a hook-and-loop fastener.

Concealing flap 155 may be substantially opaque. In one embodiment, concealing flap 155 comprises a material substantially identical to a material from which exterior surface 110 is made. For example, the concealing flap and exterior surface 110 may have a substantially identical color and/or graphical pattern (e.g., a camouflage pattern). In an exemplary embodiment, concealing flap 155 is flexible and may be rolled, folded, and/or disposed between charging pack 105 and exterior surface 110 to facilitate exposure of PV panel 130 to light energy.

Figure 3:
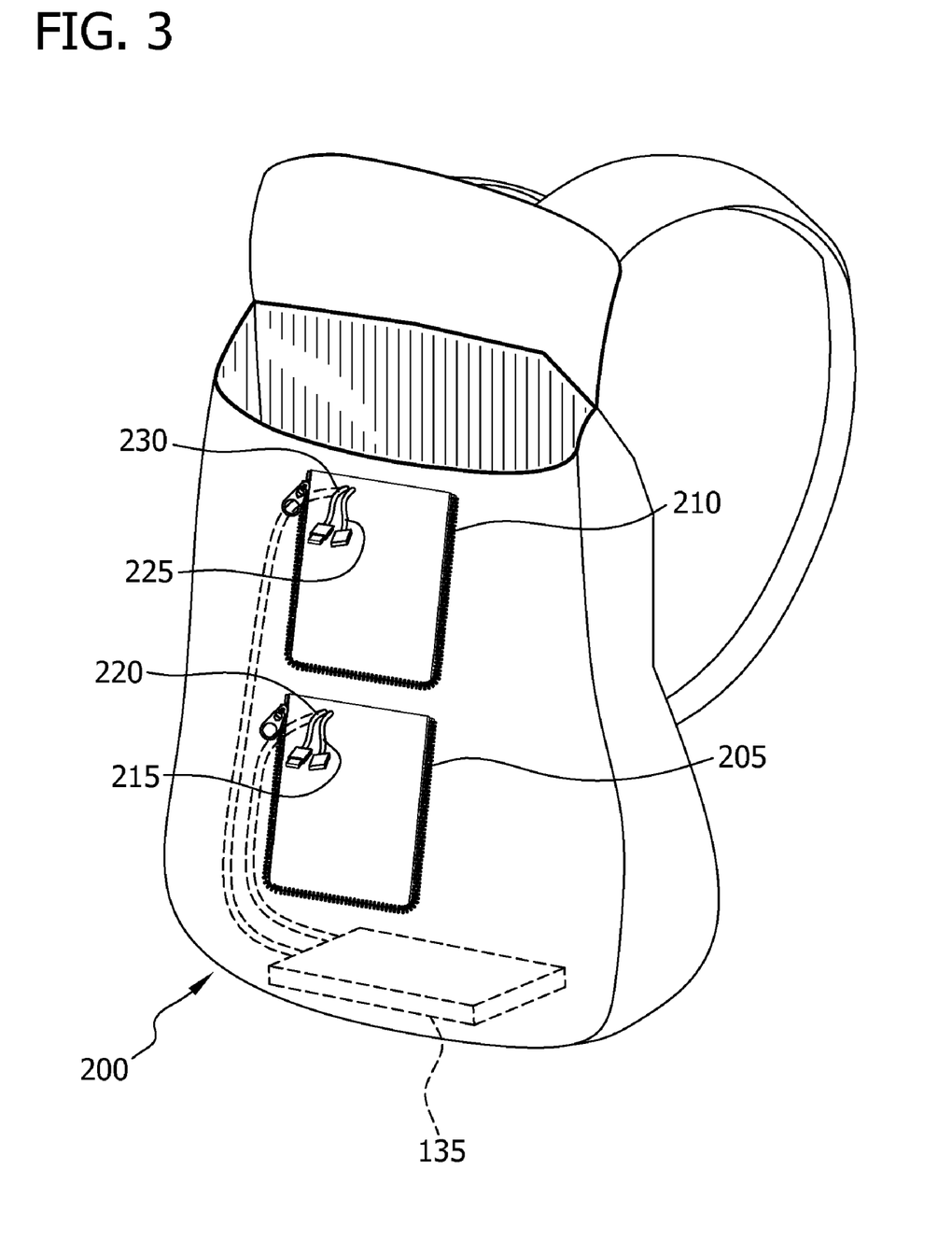
FIG. 3 is a front view of an exemplary container including a plurality of receiving devices.

FIG. 3 is a front view of an exemplary container 200 including a first receiving device 205 and a second receiving device 210. Each of receiving devices 205 and 210 is detachably couplable to a PV charging pack such as PV charging pack 105. While two receiving devices 205 and 210 are shown in FIG. 3, container 200 may include any number of receiving devices.

In one embodiment, container 200 includes energy storage device 135. Container 200 also includes a first energy input connector 215 and a first energy output connector 220 for electrically coupling energy storage device 135 to a first PV charging pack coupled to first receiving device 205. Container 200 also includes a second energy input connector 225 and a second energy output connector 230 for electrically coupling energy storage device 135 to a second PV charging pack coupled to second receiving device 210. Such an embodiment facilitates charging energy storage device 135 simultaneously from multiple PV panels and powering and/or charging multiple portable electronic devices and/or energy storage devices simultaneously from energy storage device 135. Such an embodiment further facilitates using electrical energy from a PV panel and/or energy storage device of one PV charging pack to charge a portable electronic device and/or energy storage device of another PV charging pack.

Figure 4:
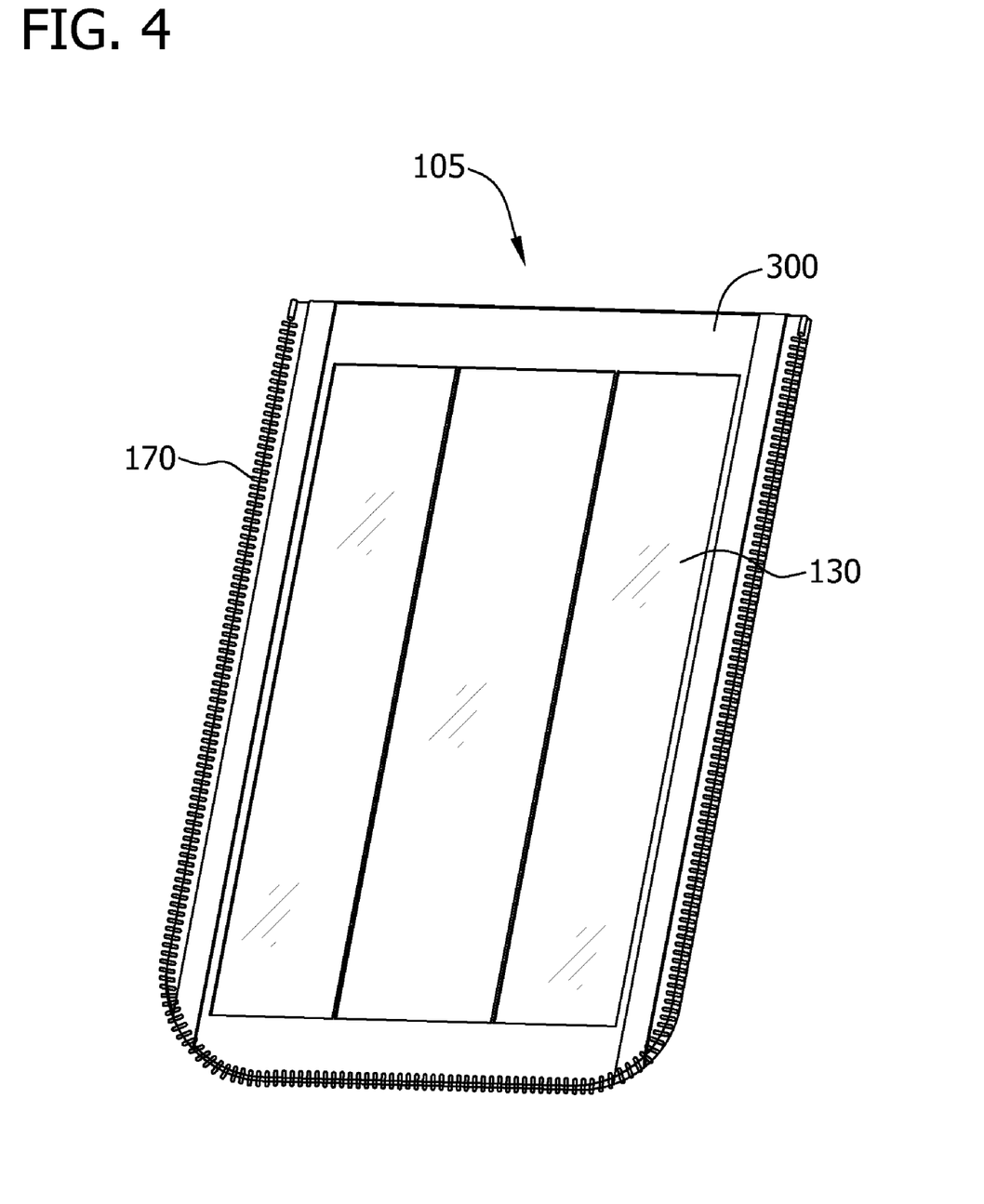
FIG. 4 is a perspective anterior view of the PV charging pack shown in FIGS. 1 and 2.

FIG. 4 is a perspective anterior view of PV charging pack 105. PV charging pack 105 includes PV panel 130 coupled to a first surface 300 and includes mounting device 170 for removably coupling PV charging pack 105 to a receiving device such as receiving device 120. In the exemplary embodiment, mounting device 170 is a zipper. However, mounting device 170 may be any device operable to removably couple PV charging pack 105 to a receiving device. For example, mounting device 170 may include, but is not limited to, a hook-and-loop fastener, a snap fastener, a clip fastener, a strap, a loop or ring, a buckle, a buttonhole, a magnet, and/or a hook. In some embodiments, mounting device 170 is a device for removably coupling PV charging pack 105 to an article of clothing (e.g., a shirt or a jacket) or a clothing accessory (e.g., a hat or a helmet). Mounting device 170 may be operable to couple PV charging pack 105 to a receiving device and to one or more other structures. For example, a magnet may be operable to couple PV charging pack 105 to a container with a corresponding magnet and to a ferromagnetic surface.

Figure 5:
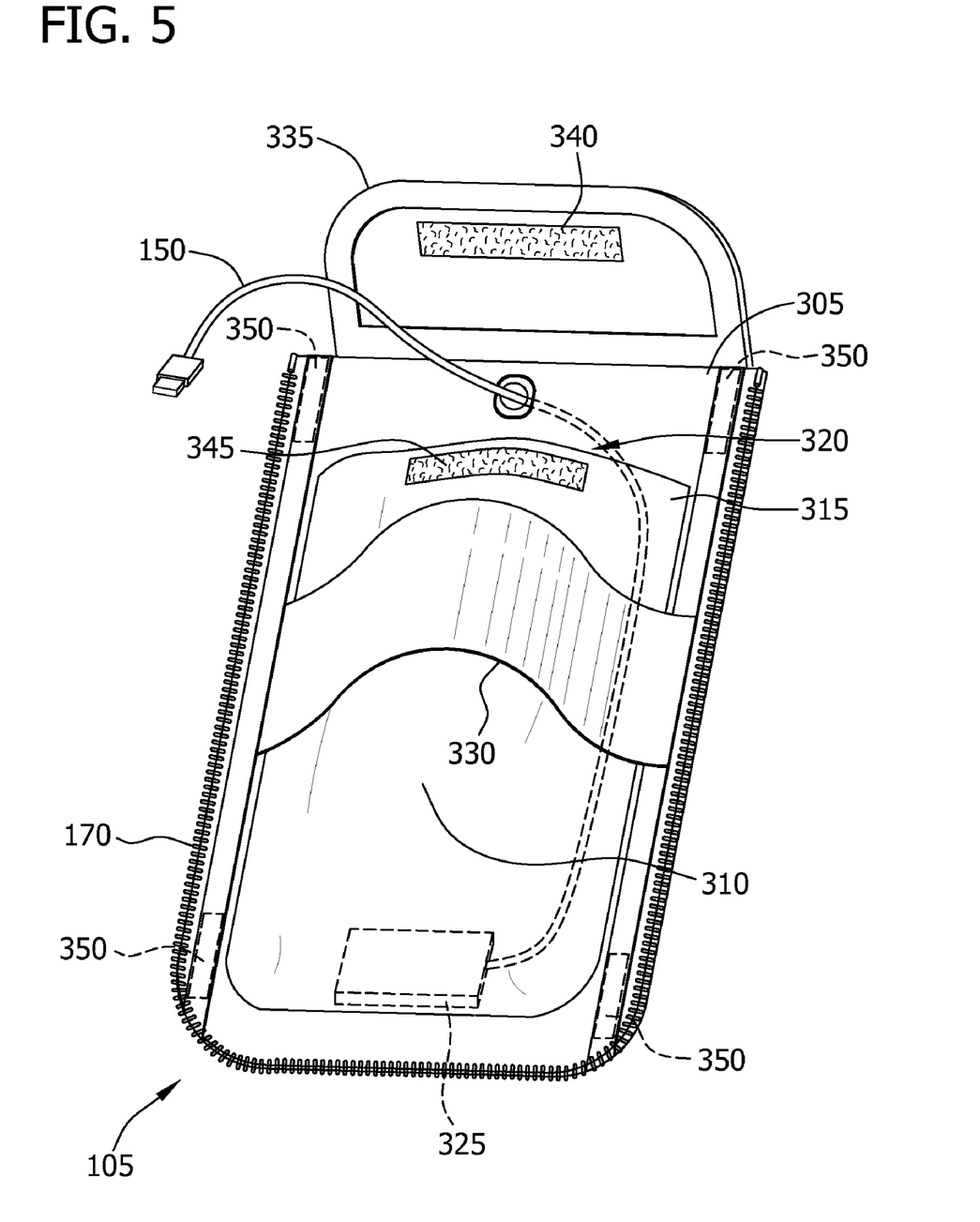
FIG. 5 is a perspective posterior view of the PV charging pack shown in FIGS. 1 and 2.

FIG. 5 is a perspective posterior view of PV charging pack 105. PV charging pack 105 defines, on a second surface 305, a compartment 310 for containing a portable electronic device. In the exemplary embodiment, a panel 315 defines compartment 310 and an opening 320 to receive a portable electronic device. PV charging pack 105 also includes a charging connector 150 electrically coupled to the PV panel 130. Charging connector 150 is electrically couplable to a portable electronic device and/or an energy storage device. When coupled to such a device, charging connector 150 transfers energy from PV panel 130 to the coupled device.

In some embodiments, PV charging pack 105 includes a voltage regulator 325 configured to electrically couple PV panel 130 to charging connector 150. Voltage regulator 325 may include a step-up transformer and/or a step-down transformer. Voltage regulator 325 is operable to maintain a substantially constant voltage output at charging connector 150 and/or to produce a desired voltage at charging connector 150 when one or more PV panels 130 of PV charging pack 105 produce a voltage that is lower or higher than the desired voltage.

PV charging pack 105 may also include an armband 330 coupled to PV charging pack 105, such as to second surface 305. When PV charging pack 105 is worn on an arm, PV panel 130 is configured to absorb light energy, facilitating charging of a portable electronic device contained in compartment 310. In one embodiment, PV panel 130 faces away from the arm.

In some embodiments, PV charging pack 105 includes a compartment closing device 335. Compartment closing device 335 facilitates securing objects, such as a portable electronic device, in compartment 310 and/or preventing environmental elements (e.g., rain and/or dirt) from entering compartment 310. In an exemplary embodiment, compartment closing device 335 is a compartment flap including an attachment device 340, and PV charging pack 105 includes a complementary attachment device 345. For example, attachment devices 340 and 345 may include a hook-and-loop fastener, a zipper, a snap fastener, a clip fastener, a strap and a buckle, a strap and a loop, a button and a buttonhole, mutually attractive magnets, and/or a magnet and a ferromagnetic component.

In some embodiments, PV charging pack mounting device 170 is a first mounting device for removably coupling PV charging pack 105 to a receiving device of a carrying device. PV charging pack 105 may also include one or more additional mounting devices 350 for removably coupling PV charging pack 105 to a surface (not shown). Additional mounting devices 350 may include, but are not limited to, a magnet, a suction cup, and/or a hook-and-loop fastener. For example, one or more magnets may be used to removably couple PV charging pack 105 to a ferromagnetic surface, such as a steel panel of a vehicle.

Figure 6:
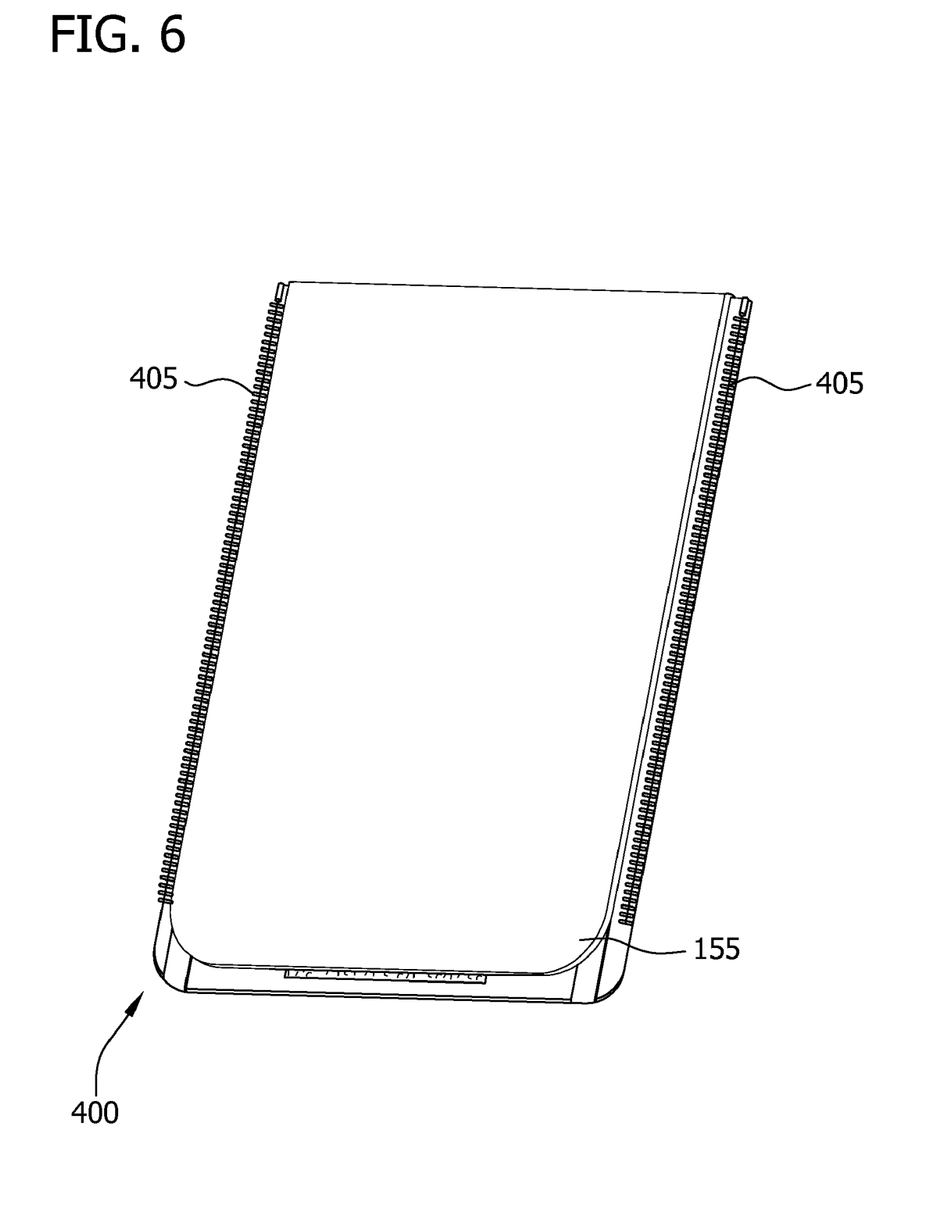
FIG. 6 is an perspective anterior view of an exemplary PV charging pack with a concealing flap in an engaged position.

FIG. 6 is an perspective anterior view of an exemplary PV charging pack 400 with a concealing flap 155 in an engaged position. In the engaged position, concealing flap 155 substantially covers a PV panel (shown in FIG. 7), facilitating physical and/or visual shielding of the PV panel. PV charging pack 400 includes two zippers 405 as mounting devices.

Figure 7:
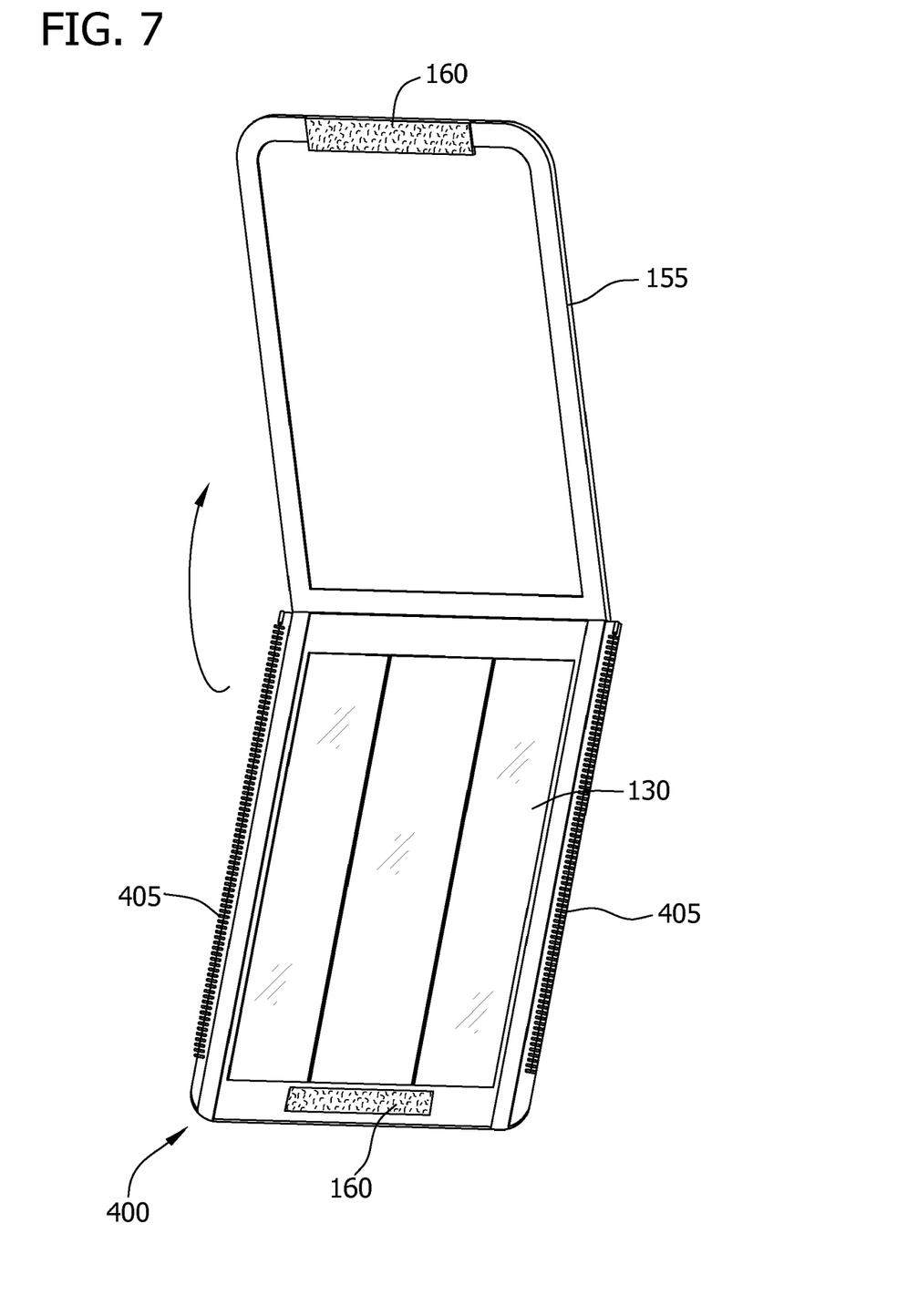
FIG. 7 is an perspective anterior view of the PV charging pack shown in FIG. 6 with the concealing flap in a disengaged position.

FIG. 7 is an perspective anterior view of PV charging pack 400 with concealing flap 155 in a disengaged position. PV charging pack 400 includes concealing flap fasteners 160 for detachably securing concealing flap 155 in an engaged position. Concealing flap fasteners 160 may include a zipper, a hook-and-loop fastener, a snap fastener, a clip fastener, mutually attractive magnets, a magnet and a ferromagnetic component, a hook and a ring or loop, and/or any fastener operable to detachably secure concealing flap 155 in an engaged position. In FIG. 7, concealing flap fasteners 160 are illustrated as hook-and-loop fasteners.

With concealing flap 155 in a disengaged position, PV panel 130 is exposed, facilitating conversion of light into electrical energy. Concealing flap 155 may be substantially flexible, substantially rigid, or a combination of substantially flexible and substantially rigid.

FIG. 8 is a perspective posterior view of PV charging pack 400. PV charging pack 400 includes a mesh panel 410 defining an opening 415 to a compartment 420. PV charging pack 400 also includes a first charging connector 435 for electrically coupling PV panel 130 to an energy storage device 430, which is disposable within compartment 420. A second charging connector 440, also disposable within compartment 420, is included for electrically coupling energy storage device 430 to a portable electronic device. In an exemplary embodiment, second charging connector 440 is further operable to couple a portable electronic device to a computer port, such as a USB port.

In one embodiment, PV charging pack 400 includes a hanging device 425 for hanging PV charging pack 400 from any suitable structure. For example, PV charging pack 400 may be hung from a tree limb with PV panel 130 exposed to sunlight to facilitate charging of energy storage device 430 and/or a portable electronic device.

Figure 9:
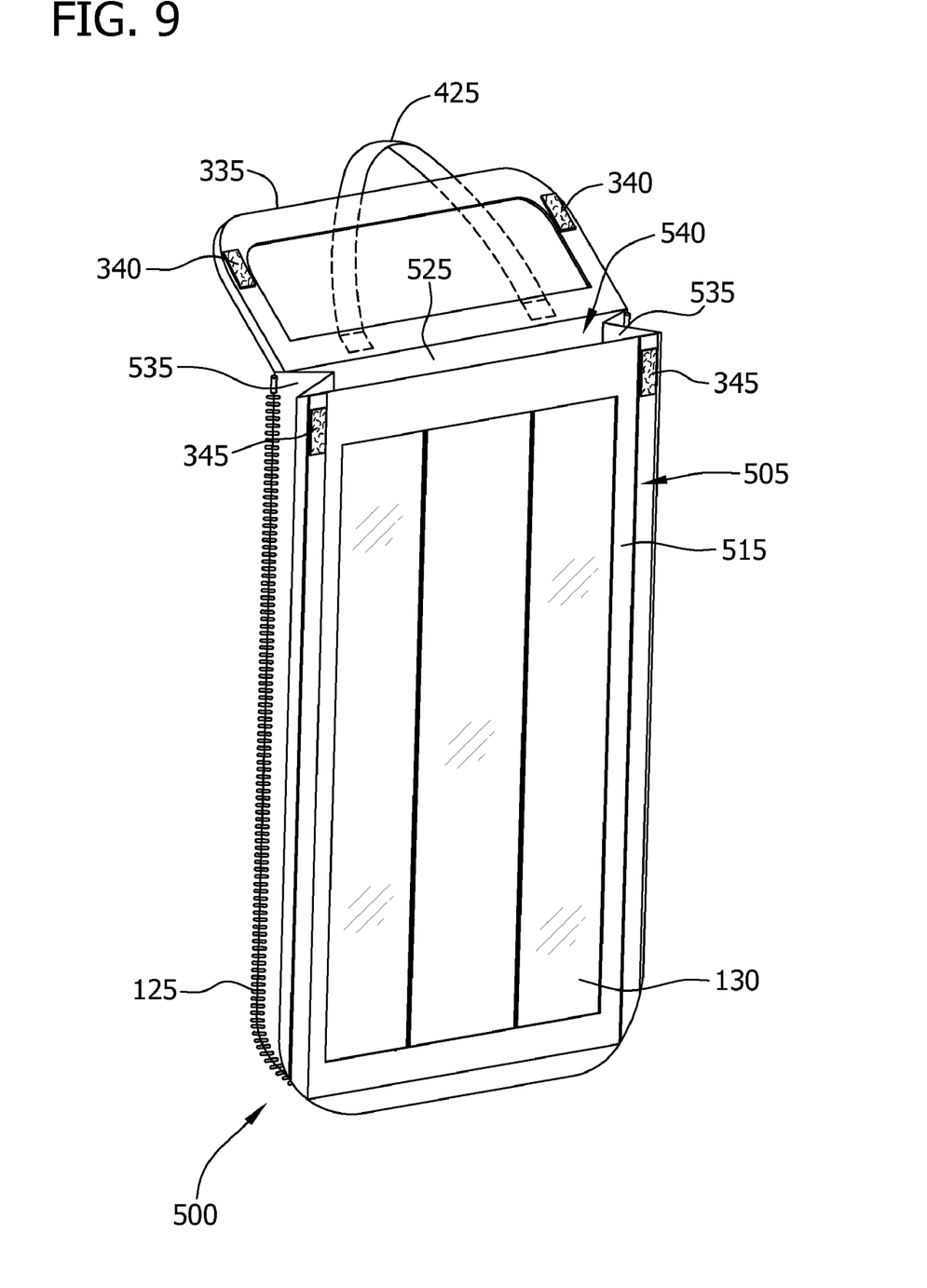
FIG. 9 is an perspective anterior view of an exemplary PV charging pack having two PV panels.
Figure 10:
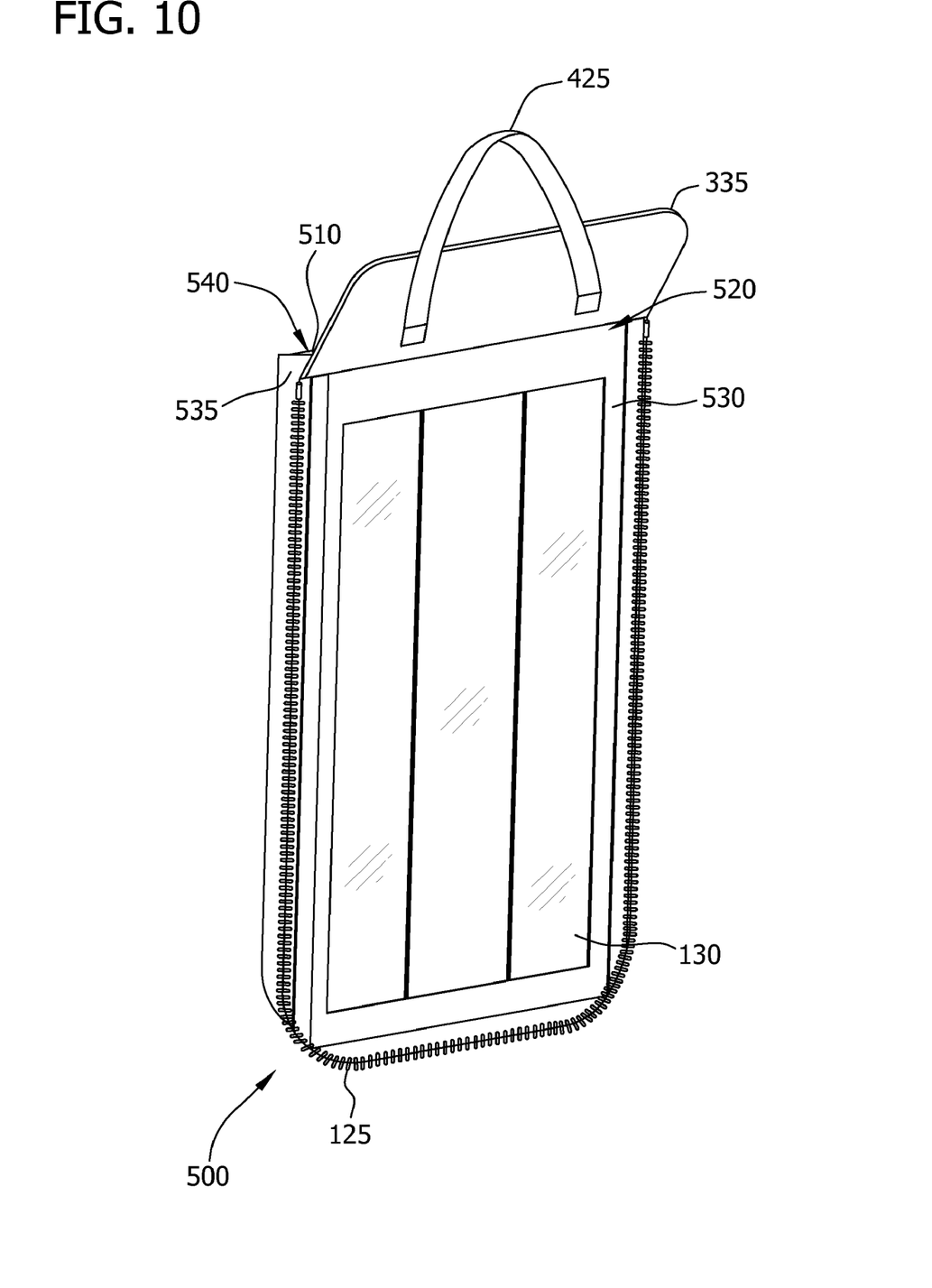
FIG. 10 is a perspective posterior view of the PV charging pack shown in FIG. 9.

FIGS. 9 and 10 are complementary perspective views of an exemplary PV charging pack 500. Specifically, FIG. 9 illustrates an anterior view of PV charging pack 500, and FIG. 10 illustrates a posterior view of PV charging pack 500. PV charging pack 500 includes a first structural panel 505 having a first interior surface 510 and a first exterior surface 515. PV charging pack 500 also includes a second structural panel 520, opposite first structural panel 505, having a second interior surface 525 and a second exterior surface 530. Exterior surface 515 and/or exterior surface 530 include a PV panel 130. Structural panels 505 and 520 are arranged so that first interior surface 510 faces second interior surface 525. First structural panel 505 may be coupled to second structural panel 520 via one or more joining panels 535. For example, a joining panel 535 may be a folded panel that expands by unfolding and/or an elastic panel that expands by stretching.

In an exemplary embodiment, a compartment 540 is defined between first interior surface 510 and second interior surface 525, and PV charging pack 500 also includes compartment closing device 335 and attachment devices 340 and 345. Hanging device 425 is coupled to compartment closing device 335. Alternatively, hanging device 425 may be coupled to second exterior surface 530.

Because PV charging pack 500 includes a PV panel 130 on both exterior surfaces 515 and 530, PV charging pack 500 facilitates charging a portable electronic device and/or an energy storage device while PV charging pack 500 is suspended by hanging device 425. For example, PV charging pack 500 may be hung from a hook or a tree limb and allowed to swivel in response to wind. In this configuration, regardless of the orientation of PV charging pack 500, at least one of PV panels 130 is likely to face a source of direct or reflected light energy.

In one embodiment, first structural panel 505 and second structural panel 520 are detachably coupled to each other, in part or in whole. For example, one or more joining panels 535 may include a fastener, such as a zipper, for detachably coupling structural panels 505 and 520. Structural panels 505 and 520 may be partly permanently coupled (e.g., via a hinge), with a conductor electrically coupling PV panels 130.

Other embodiments with multiple, detachably coupled PV panels 130 are also contemplated. Such embodiments facilitate configuring (e.g., by unfolding) PV panels 130 for substantially optimal light collection. For example, a plurality of PV panels 130 may be arranged to face a source of light, and the plurality of panels may be detachably coupled to a surface, such as a steel panel, by a mounting device, such as a magnet.

Figure 11:
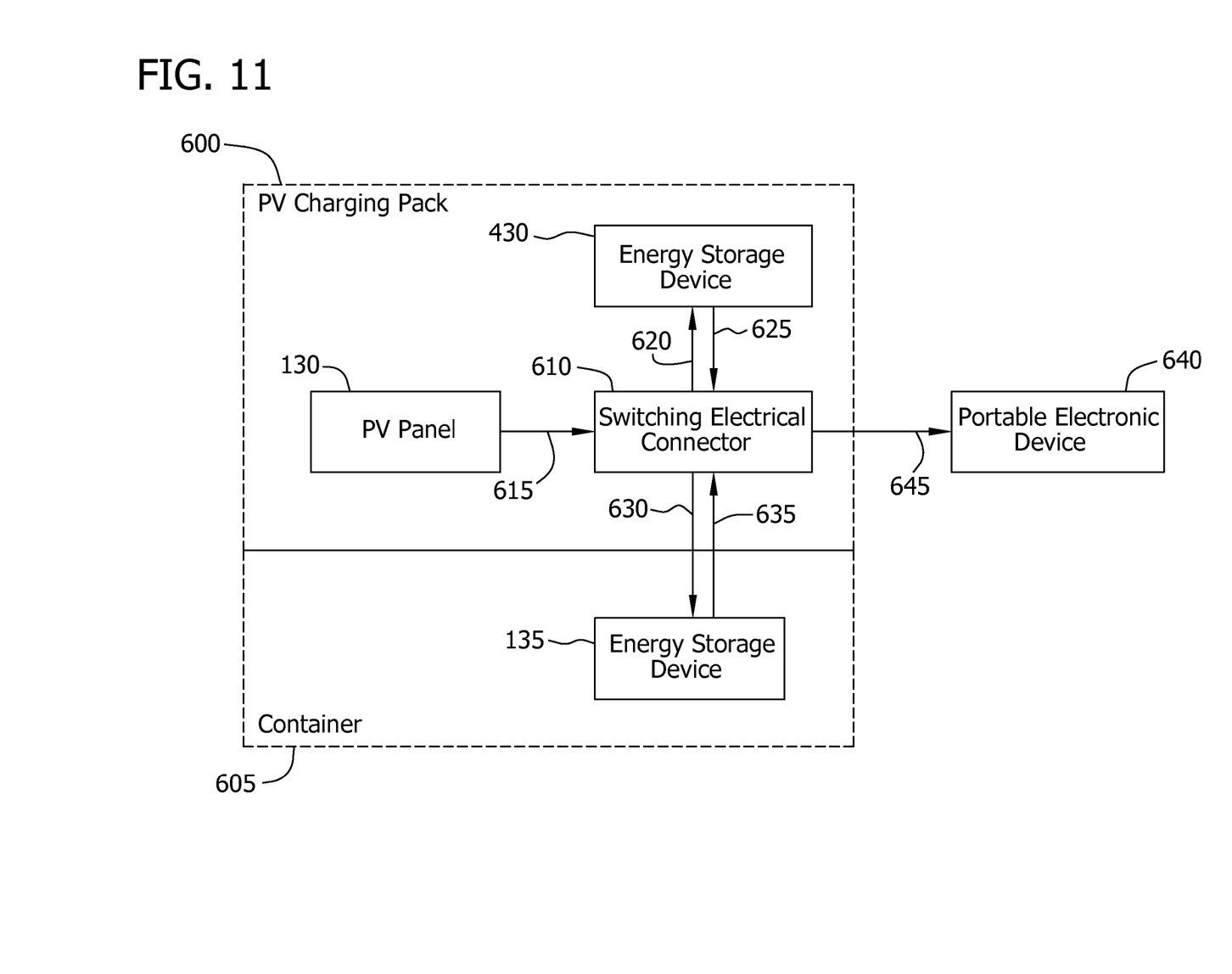
FIG. 11 is a block diagram of a switching electrical connector and other operable components within an exemplary PV charging pack and container.

FIG. 11 is a block diagram of a switching electrical connector 610 and other operable components within an exemplary PV charging pack 600 and a container 605. PV charging pack 600 includes at least one PV panel 130, PV charging pack energy storage device 430, and switching electrical connector 610. Container 605 includes energy storage device 135. Arrows in FIG. 11 indicate electrical energy transmission between the illustrated components.

Switching electrical connector 610 is electrically coupled to PV panel 130 via a PV panel connector 615. Switching electrical connector 610 is electrically couplable to energy storage device 430 via a first charging connector 620 and a first extraction connector 625. Switching electrical connector 610 is electrically couplable to energy storage device 135 via a second charging connector 630 and a second extraction connector 635. Switching electrical connector 610 is also electrically couplable to a portable electronic device 640 via a device connector 645. First charging connector 620 and first extraction connector 625 may be combined into a single physical connector with conductors for transmitting energy in each direction. First connectors 620 and 625 may instead be combined into a single, bidirectional connector capable of transmitting energy in either direction. Second charging connector 630 and second extraction connector 635 may be combined as described with regard to first connectors 620 and 625.

In the exemplary embodiment, switching electrical connector 610 is configured to detect which of energy storage device 430, energy storage device 135, and portable electronic device 640 are electrically coupled to switching electrical connector 610. Switching electrical connector 610 is also configured to electrically couple the other components 130, 630, 135, and 640 based on which components are coupled to switching electrical connector 610 and/or based on an operational state of the components.

For example, switching electrical connector 610 is configured to electrically couple a power source (i.e., PV panel 130, energy storage device 430, or energy storage device 135) to portable electronic device 640. For example, if energy storage device 430 and energy storage device 135 are not coupled to switching electrical connector 610, switching electrical connector 610 electrically couples PV panel 130 to portable electronic device 640. In one embodiment, if energy storage device 430 is coupled to switching electrical connector 610, switching electrical connector 610 electrically couples PV panel 130 to energy storage device 430 by electrically coupling PV panel connector 615 to first charging connector 620. Switching electrical connector 610 also electrically couples energy storage device 430 to portable electronic device 640 by electrically coupling first extraction connector 625 to device charging connector 645.

Switching electrical connector 610 may detect an operation state of a component 130, 430, 135, and/or 640. For example, switching electrical connector may determine a charge level of energy storage device 430, energy storage device 135, and/or portable electronic device 640. In one embodiment, switching electrical connector 610 is configured to optimize energy distribution for powering portable electronic device 640 when PV charging pack 600 is decoupled from container 605. Specifically, switching electrical connector 610 may be configured to electrically couple PV panel 130 to energy storage device 430 via PV panel connector 615 and first charging connector 620 until energy storage device 430 substantially reaches a maximum charge level. Switching electrical connector 610 may, simultaneously, couple energy storage device 430 to portable electronic device 640 via first extraction connector 625 and device charging connector 645. In such a configuration, energy storage device 430 receives energy from PV panel 130 and discharges energy to portable electronic device 640; energy storage device 430 may thus reach a maximum charge level only when both energy storage device 430 and portable electronic device 640 reach a maximum charge level.

When energy storage device substantially reaches a maximum charge level, switching electrical connector 610 decouples energy storage device 430 from PV panel 130 and electrically couples PV panel 130 to energy storage device 135 via PV panel connector 615 and second charging connector 630. In some embodiments, switching electrical connector 610 is configured to electrically couple energy storage device 135 to energy storage device 430 by electrically coupling second extraction connector 635 to first charging connector 620, thereby facilitating charging of energy storage device 430 from energy storage device 135. Switching electrical connector 610 may electrically couple PV panel 130 and energy storage device 135 to energy storage device 430 simultaneously.

Switching electrical connector 610 facilitates simplified connection of portable electronic device 640 to PV panel 130, energy storage device 430, and energy storage device 135 by providing a single connector in the form of device connector 645, regardless of which other components are present. Switching electrical connector 610 further facilitates optimization of energy transmission to ensure energy is available for portable electronic device 640 when PV charging pack 600 is decoupled from container 605 and, consequently, decoupled from energy storage device 135.

Exemplary embodiments of a PV charging pack and a container are described above in detail. The PV charging pack, container, and included assemblies are not limited to the specific embodiments described herein, but, rather, each component may be utilized independently and separately from other components described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A portable container having an exterior surface and defining an interior compartment, the portable container comprising:

a photovoltaic (PV) charging pack comprising a PV panel and a charging connector electrically coupled to the PV panel, the PV charging pack defining on a surface of the PV charging pack a compartment for containing a portable electronic device, wherein the PV charging pack is directly electrically couplable to the portable electronic device via a device connector when the portable electronic device is contained in the compartment; and a PV charging pack receiving device coupled to the exterior surface for detachably coupling the PV charging pack to the exterior surface, the PV charging pack receiving device including a receiving compartment with a substantially transparent panel, wherein the PV panel is configured to absorb light energy when the PV charging pack is positioned within the receiving compartment.

2. The portable container of claim 1, wherein the PV charging pack further comprises a concealing flap for covering the PV panel.

3. The portable container of claim 1, wherein the PV charging pack further comprises an armband.

4. The portable container of claim 1, wherein the receiving device is a first receiving device, the portable container further comprising a second receiving device.

5. The portable container of claim 1, further comprising an energy storage device, wherein the charging connector electrically couples the PV charging pack to the energy storage device.

* * * * *